US009648134B2

(12) United States Patent
Frank (10) Patent No.: US 9,648,134 B2
(45) Date of Patent: May 9, 2017

(54) OBJECT MIGRATION BETWEEN CLOUD ENVIRONMENTS (71) Applicant: Empire Technology Development LLC, Wilmington, DE (US)

(72) Inventor: Alexander Frank, Bellevue, WA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 232 days.

(21) Appl. No.: 14/003,770

(22) PCT Filed: May 20, 2013

(86) PCT No.: PCT/US2013/041779
§ 371 (c)(1),
(2) Date: Sep. 6, 2013

(87) PCT Pub. No.: WO2014/189481
PCT Pub. Date: Nov. 27, 2014

(65) Prior Publication Data
US 2014/0344395 A1 Nov. 20, 2014

(51) Int. Cl.
*G06F 15/16* (2006.01)
*H04L 29/08* (2006.01)
*G06F 9/48* (2006.01)

(52) U.S. Cl.
CPC ............ *H04L 67/34* (2013.01); *G06F 9/4856* (2013.01)

(58) Field of Classification Search
CPC . G06F 17/303; G06F 9/45533; H04L 67/1002
See application file for complete search history.

(56) References Cited

U.S. PATENT DOCUMENTS 7,707,573 B1 * 4/2010 Marmaros ................. G06F 8/61
709/224
8,261,295 B1 9/2012 Risbood et al.
(Continued)

OTHER PUBLICATIONS

International Search Report and Written Opinion for PCT/US13/41779 filed May 20, 2013, mailed on Jul. 24, 2013.
(Continued)

*Primary Examiner* — Tauqir Hussain
*Assistant Examiner* — Kamran Mohammadi
(74) *Attorney, Agent, or Firm* — Turk IP Law, LLC (57) ABSTRACT Technologies are generally described for a system for migrating an application between cloud environments such as datacenters. In some examples, an application hosted at a source cloud may be moved from the source cloud to the destination cloud by migrating one or more objects at a time from the source to the destination cloud while maintaining the application up and running by intercepting and redirecting requests to a source or destination depending on where related objects reside. Example objects may be data structures, attributes and associated behaviors that encapsulate the application. Migration of the objects may be facilitated by enumerating and serializing the objects, and loading subsets of one or more serialized objects at the destination datacenter. An object migration module may keep track of objects in transit, and may direct requests for transferred objects to the destination cloud for maintaining continued access to the application.

20 Claims, 6 Drawing Sheets (56) References Cited

U.S. PATENT DOCUMENTS

| | | |
|---|---|---|
| 2010/0287263 A1 | 11/2010 | Liu et al. |
| 2010/0318608 A1 | 12/2010 | Huang et al. |
| 2010/0332401 A1* | 12/2010 | Prahlad ............... G06F 17/3002 705/80 |
| 2011/0099318 A1 | 4/2011 | Hudzia et al. |
| 2011/0153697 A1 | 6/2011 | Nickolov et al. |
| 2011/0179415 A1 | 7/2011 | Donnellan et al. |
| 2012/0084445 A1 | 4/2012 | Brock et al. |
| 2012/0221845 A1 | 8/2012 | Ferris |
| 2012/0254355 A1 | 10/2012 | Kihara |
| 2013/0013767 A1* | 1/2013 | Stober ................. G06F 9/44505 709/224 |
| 2013/0110967 A1 | 5/2013 | Ueoka et al. |
| 2013/0204849 A1* | 8/2013 | Chacko ................ G06F 3/0604 707/692 |
| 2013/0204963 A1* | 8/2013 | Boss .................... G06F 3/0604 709/217 |
| 2014/0067994 A1* | 3/2014 | Puttaswamy Naga .................. H04L 41/0896 709/217 |
| 2014/0115161 A1* | 4/2014 | Agarwal ............. G06F 9/45558 709/226 |
| 2014/0149421 A1* | 5/2014 | Ashok ................ G06Q 10/0631 707/741 |
| 2014/0156813 A1* | 6/2014 | Zheng .................... H04L 67/16 709/220 |

OTHER PUBLICATIONS

Elmore, et al., "Zephyr: Live Migration in Shared Nothing Databases for Elastic Cloud Platforms", Jun. 12-16, 2011, SIGMOD'11.

Hudzia, "Live Migration Optimization for VM Running Large Enterprise Applications", http://voidreflections.blogspot.com/2012/01/live-migration-optimization-for-vm.html. Jan. 3, 2012.

Hacking, et al., "Improving the Live Migration Process of Large Enterprise Applications", VTDC'09, Jun. 15, 2009, Barcelona, Spain.

Hines, et al., "Post-Copy Live Migration of Virtual Machines", ACM SIGOPS Mar. 11-13, 2009, 43(3) pp. 14-26.

* cited by examiner

OBJECT MIGRATION BETWEEN CLOUD ENVIRONMENTS

CROSS-REFERENCE TO RELATED APPLICATION

This Application is the U.S. National Stage filing under 35 U.S.C §371 of International Application Ser. No. PCT/US2013/041779 filed on May 20, 2013. The International Application is herein incorporated by reference in its entirety.

BACKGROUND

Unless otherwise indicated herein, the materials described in this section are not prior art to the claims in this application and are not admitted to be prior art by inclusion in this section.

With the advance of networking and data storage technologies, an increasingly large number of computing services are being provided to users or customers by cloud-based datacenters that may enable leased access to computing resources at various levels. Datacenters may provide individuals and organizations with a range of solutions for systems deployment and operation. Depending on customer needs, datacenter capabilities, and associated costs, services provided to customers may be defined by Service Level Agreements (SLAs) describing aspects such as server latency, storage limits or quotas, processing power, scalability factors, backup guarantees, uptime guarantees, resource usage reporting, and similar ones.

Not all cloud based services may be similar in terms of scope, structure, and performance requirements. For example, a cloud-based email or photo sharing service may have different operating parameters compared to a cloud-based video gaming service. The underlying cloud platform software may also be different. When a customer decides to move its data and/or applications from one cloud to another (e.g., from one datacenter to another), the process may be relatively cumbersome due to lack of methods to formalize, normalize, and communicate computing requirements across clouds.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

According to some examples, the present disclosure generally describes methods for migrating an application between cloud computing environments. The method may include receiving a request to migrate an application from a source cloud to a destination cloud, identifying one or more objects associated with the application to be migrated, enumerating the one or more objects employing a source interface executed at the source cloud, designating at least one object to be migrated to the destination cloud, requesting a serialization of the object to be migrated from the source interface, marking the serialized object as in-transit while the serialized object may be in process of being migrated from the source cloud to the destination cloud, and loading the serialized object at the destination cloud.

According to other examples, the present disclosure also describes computing device operable to migrate an application between cloud computing environments. The computing device may include a memory configured to store instructions, and a processing unit configured to execute an object migration module in conjunction with the instructions. The object migration module may be configured to receive a request to migrate an application from a source cloud to a destination cloud, identify one or more objects associated with the application to be migrated, enumerate the one or more objects employing a source interface executed at the source cloud, designate at least one object to be migrated to the destination cloud, request a serialization of the object to be migrated from the source interface, mark the object as in-transit while the object may be in process of being migrated from the source cloud to the destination cloud, and load the serialized object at the destination cloud.

According to further examples, the present disclosure also describes a computer readable medium with instructions stored thereon, which when executed on one or more computing devices executes a method for migrating an application between cloud computing environments. The method may include receiving a request to migrate an application from a source cloud to a destination cloud, identifying one or more objects associated with the application to be migrated, enumerating the one or more objects employing a source interface executed at the source cloud, designating at least one object to be migrated to the destination cloud, requesting a serialization of the object to be migrated from the source interface, marking the serialized object as in-transit while the serialized object may be in process of being migrated from the source cloud to the destination cloud, and loading the serialized object at the destination cloud.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, among other things, to compositions, methods, apparatus, systems, devices, and/or computer program products related to application migration between cloud environments.

Briefly stated, technologies are generally described for a system for migrating an application between cloud environments such as datacenters. In some examples, an application hosted at a source cloud may be moved from the source cloud to the destination cloud by migrating one or more objects at a time from the source to the destination cloud while maintaining the application up and running by intercepting and redirecting requests to a source or destination depending on where related objects reside. Example objects may be data structures, attributes and associated behaviors that encapsulate the application. Migration of the objects may be facilitated by enumerating and serializing the objects, and loading subsets of one or more serialized objects at the destination datacenter. An object migration module may keep track of objects in transit, and may direct requests for transferred objects to the destination cloud for maintaining continued access to the application.

A datacenter as used herein refers to an entity that hosts services and applications for customers through one or more physical server installations and one or more virtual machines executed in those server installations. Customers of the datacenter, also referred to as tenants, may be organizations that provide access to their services for multiple users. Customers may also be internal customers of an organization, for example, departments with an organization that share the services of a datacenter operated by the organization (e.g., company). One example configuration may include an online retail service that provides retail sale services to consumers (users). The retail service may employ multiple applications (e.g., presentation of retail goods, purchase management, shipping management, inventory management, etc.), which may be hosted by one or more datacenters. Thus, a consumer may communicate with those applications of the retail service through a client application such as a browser over one or more networks and receive the provided service without realizing where the individual applications are actually executed. This scenario contrasts with conventional configurations, where each service provider would execute their applications and have their users access those applications on the retail services own servers physically located on retail service premises. One result of the networked approach as described herein is that customers like the retail service may move their hosted services/applications from one datacenter to another without the users noticing a difference.

Figure 1:
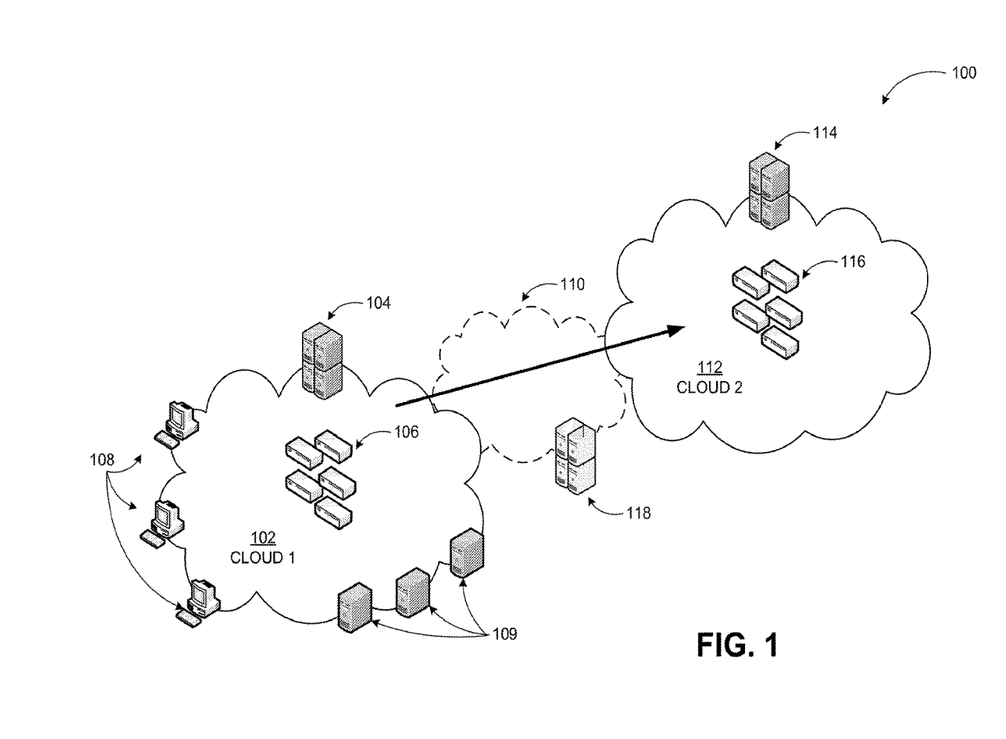
FIG. 1 illustrates an example system, where object migration of an application between cloud computing environments may be implemented.

FIG. 1 illustrates an example system, where object migration of an application between cloud computing environments may be implemented, arranged in accordance with at least some embodiments as described herein.

As shown in a diagram 100, a service provider such as a cloud 1 (102) may host services such as various applications, data storage, data processing, or comparable ones for individual or enterprise customers 108 and 109. The cloud 1 (102) may include one or more datacenters providing the services, and employ one or more servers 104 and/or one or more special purpose devices 106 such as firewalls, routers, and so on. In providing the services to its customers, the cloud 1 (102) may employ multiple servers, special purpose devices, physical or virtual data stores, etc. Thus, an application hosted or data stored by the cloud 1 (102) for a customer may involve a complex architecture of hardware and software components. The complexity may become a burden when a customer decides to migrate to another cloud, and the application may degrade and experience downtime during migration as a result.

Cloud-based service providers may have disparate architectures and provide similar services but with distinct parameters. For example, data storage capacity, processing capacity, server latency, and similar aspects may differ from cloud to cloud. Additionally, the service parameters may vary depending on the provided service. Thus, application migration may involve dealing with potentially incompatible cloud application programming interfaces as well as addressing issues at each level of an application stack, as a source cloud and destination cloud may have differences in hypervisors, operating systems, databases, storage and network configurations, and drivers. Furthermore, the hosting clouds may not cooperate or offer support to a migrating application, such that when the application is being migrated, the application may not have access to resources of the cloud such as memory image and/or a hard disk drive, as some examples. To reduce the burden of performing the actual migration from a source cloud to a target cloud without reducing downtime and degradation of the migrating application, some embodiments described herein enable cloud migration through migrating an application object by object employing an object management module. The migrating application may be maintained up and running by intercepting and redirecting requests to a source or destination depending on where related objects reside. Furthermore, objects may be read at the source cloud even though they are migrating.

In the diagram 100, the cloud 1 (102) may be a source cloud and a cloud 2 (112) may be a target cloud in a migration process. Similar to the cloud 1 (102), the cloud 2 (112) may also employ one or more servers 114 and one or more special purpose devices 116 to provide its services. The migration of the application employing an object migration module to facilitate object-by-object migration may be managed and performed by one of the servers 104 of the cloud 1 (102), one of the servers 114 of the cloud 2 (112), or by a third party service executed on one or more servers 118 of another cloud 110.

Figure 2:
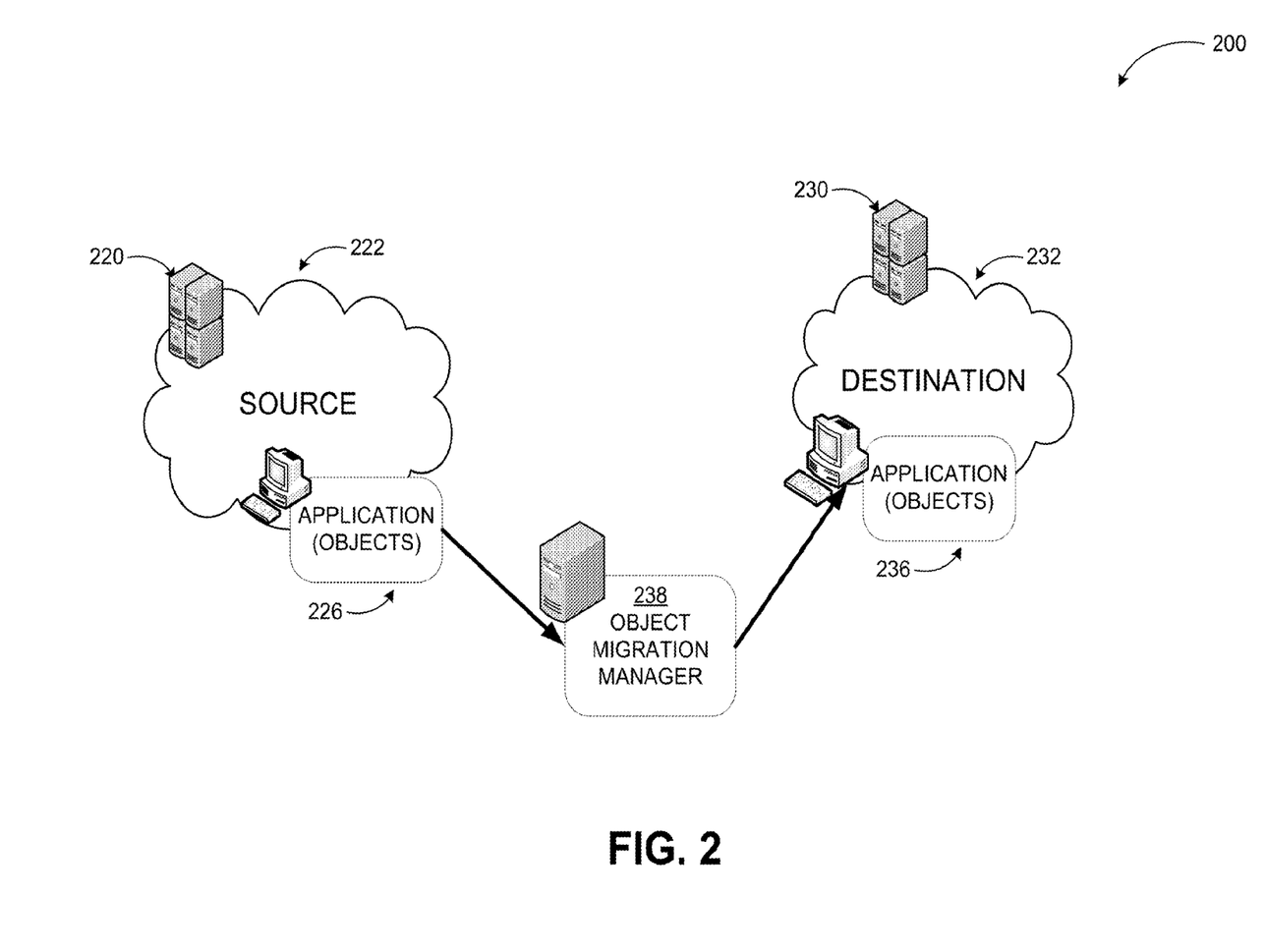
FIG. 2 illustrates one example of an object by object application migration between cloud computing environments.

FIG. 2 illustrates one example of an object by object application migration between cloud computing environments, arranged in accordance with at least some embodiments as described herein. A diagram 200 illustrates one example implementation of a migration management system according to some example embodiments.

One or more applications may be hosted at a source cloud computing environment 222 managed by one or more servers 220. As discussed previously, service parameters such as server processing, memory, and networking may be implemented in a wide variety of ways by different service providers such as the source cloud computing environment 222 and a destination cloud computing environment 232 managed by one or more servers 230. Due to the varying service parameters, migrating an application may be a burdensome process, and the migrating application may experience degradation and downtime during the migration. An application as used herein generally refers to customer or tenant applications hosted by a datacenter and not a datacenter's native applications.

According to some example embodiments, an object migration manager 238 may facilitate the migration of an application 226 from the source cloud computing environment 222 to the destination cloud computing environment 232. The object migration manager 238 may be provided as a separate migration module or as part of a cloud computing management application, capable of being executed at one of the source cloud computing environment 222 or the destination cloud computing environment 232.

The object migration manager 238 may be configured to migrate the application 226 from the source cloud computing environment 222 to the destination cloud computing environment 232 while maintaining a continuous uptime of the application 226 during the migration. The object migration manager 238 may migrate the application 226 by migrating live objects of the application 226 individually, or in subsets of objects until the entire application 236 has been migrated to the destination cloud computing environment 232. Example objects of an application may be data structures and associated processing routines. Additionally, objects may also be sets of attributes or elements, as well as behaviors, methods and subroutines that may encapsulate an entity such as an application.

The object migration manager 238 may facilitate migration of the objects by serializing and enumerating the objects at the source cloud computing environment 222. In some examples, cloud computing environments may work with different data structures, which may not be binary compatible. Serializing the objects may enable the objects to be migrated between the data structures employed at the different cloud computing environments that may not be otherwise binary compatible. During the migration of the objects of the application 226, the object migration manager 238 may direct requests for the application 226 to the cloud computing environment where an object corresponding to the request is located. Continuously handling the requests during the migration process, the object migration manager 238 may facilitate maintaining a continuous uptime of the application 226.

In some examples, possible actions upon a collision between a request leading to a modification of an existing object and the object's migration at the same time may include: (1) backing off the migration, allowing the request to proceed, and resuming the migration; (2) holding the request for a period until the migration of the object completes; or (3) declining the request (which may be included in the SLA—implied or explicit). The object migration manager's role is to orchestrate the migration and to intercept and redirect the inbound requests. Thus, the object migration manager may make the calls to the source and destination, or the source and destination may interact directly to copy the migrating objects. In the latter case the object migration manager may maintain the orchestration role, but may be offloaded of the copying itself.

Figure 3:
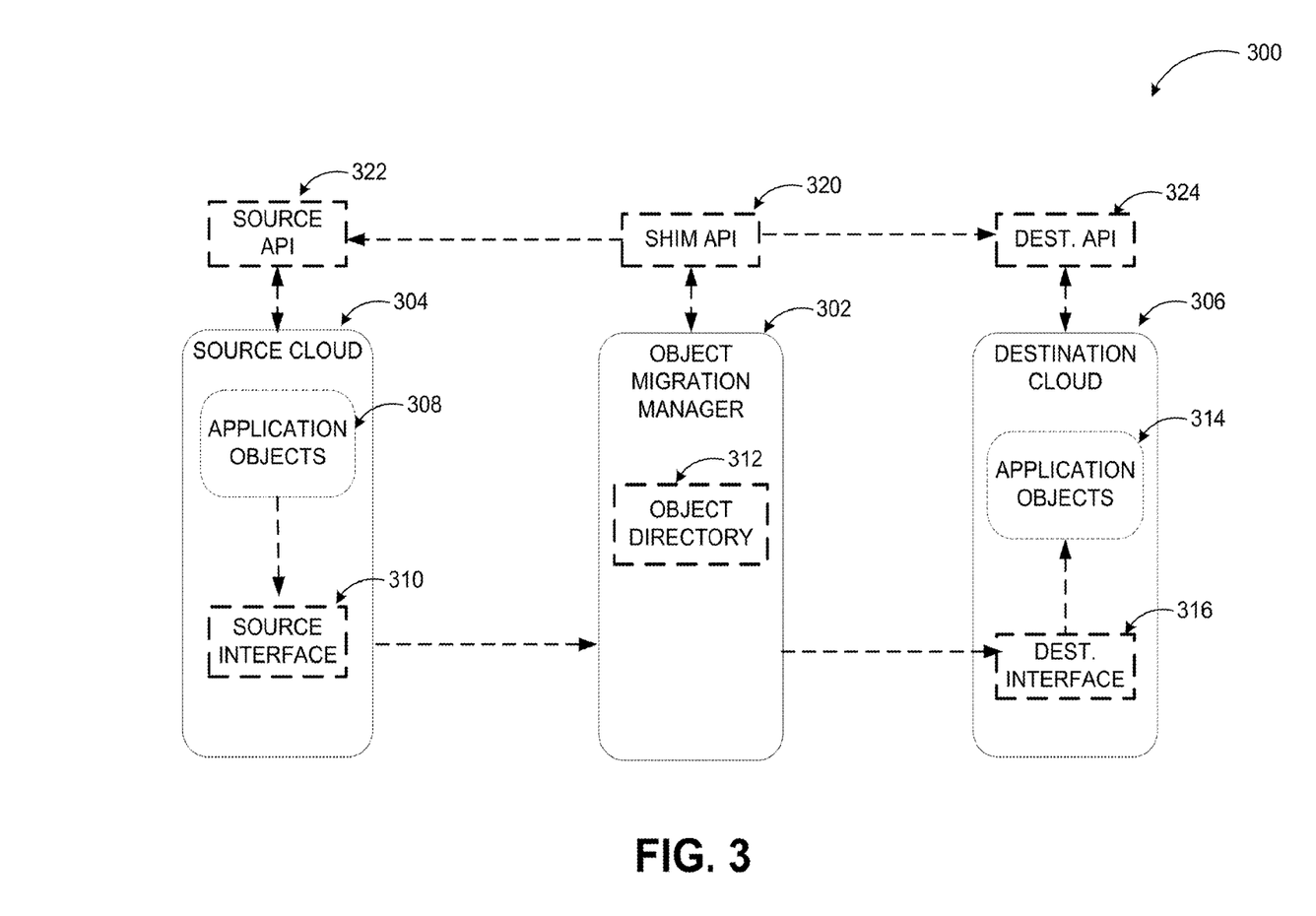
FIG. 3 illustrates a schematic of an application migration from a source to a destination cloud computing environment.

FIG. 3 illustrates a schematic of an application migration from a source to a destination cloud computing environment, arranged in accordance with at least some embodiments as described herein. As demonstrated in a diagram 300, an object migration manager (OMM) 302 may facilitate migration of an application from a source cloud 304 to a destination cloud 306 by migrating objects 308 of the application. The source cloud 304 may include a source interface 310 for retrieving objects 308, and a source application programming interface (API) 322 for receiving application requests. The destination cloud 306 may include a destination interface 316 for loading application objects 314, and a destination API 324 for receiving application requests. The OMM 302 may also include a shim API 320 for interacting with the source API 322 and the destination API 324, as well as an object directory 312.

In a system according to embodiments, when the OMM 302 receives a request to migrate an application from the source cloud 304 to the destination cloud 306, the OMM 302 may be prepared to migrate the application from the source cloud 304 to the destination cloud 306 by interacting with the source cloud 304 and the destination cloud 306. The OMM 302 may be configured to interact with the source cloud 304 and the destination cloud 306 by employing one or more of domain names and IP addresses. Additionally, the source cloud 304 may publish the source API 322, and the destination cloud 306 may publish the destination API 324 associated with the application. The source API 322 and the destination API 324 may also be programming interfaces published by the application that enable interaction with the application. The OMM 302 may publish the shim API 320 to enable interaction with the application during migration of the application. Some example mechanisms for enabling interaction between the shim API 320, the source API 322 and the destination API 324 may include employing extensible markup language or object programming languages as some examples. The shim API 320 may be configured to intercept consumer requests for the application and direct them to one of the source cloud 304 and the destination cloud 306 through the source API 322 and the destination API 324 respectively during the migration process.

Additionally, the OMM 302 may load an access pattern map for each of the source API 322 and the destination API 324. The access pattern map may describe the objects and object classes of the application accessed by the OMM 302 accesses, and may describe plausible access patterns for accessing the objects of the application to be migrated. Further, the OMM 302 may manipulate domain name system name-to-IP mapping such that requests for the application received during the migration are directed to the OMM 302 for handling.

In a system according to embodiments, the OMM 302 may identify objects 308 associated with the application at the source cloud 304 when the OMM 302 receives the migration request. The OMM 302 may implement the source interface 310 executed at the source cloud 304 to enumerate the identified objects 308 associated with the application to be migrated. An enumeration scheme for enumerating the identified objects 308 may be dictated by the OMM 302. An enumeration scheme may allow for set-definition of objects, that is, enabling the use of queries that define sets of objects. One example enumeration scheme may be enumerating objects by date, such as all the objects created after Oct. 9, 2012 at 9:21 am. The OMM 302 may also implement the destination interface 316 executed at the destination cloud 306 such that the destination interface 316 and the source interface 310 may be compatible.

In an example embodiment, the OMM 302 may create the object directory 312 in order to keep track of the objects 308 associated with the application. The object directory 312 may keep track of the location of each of the objects 308 during the migration process, including an indication as to whether the object is currently at the source cloud 304, at the destination cloud 306, or in transit between the source cloud 304 and the destination cloud 306. If a request and/or inquiry pertaining to a particular object are received during the migration process, the object OMM 302 may direct the request to the appropriate location based on the location information of the objects from the object directory 312. For example, once the migration has begun, any request for creation of a new object may be directed to the destination cloud 306.

To initiate the migration of the application, the OMM 302 may designate at least one object from the identified objects to be migrated. The OMM 302 may request a serialization of the at least one object from the source interface 310. The source interface 310 may be configured to serialize the objects 308 with a serialization schema that may also be compatible with the destination interface 316 executed at the destination cloud. For example, the objects 308 may be serialized employing an extensible markup language (XML) serialization schema. The OMM 302 may retrieve the serialized object to be migrated from the source interface 310 at the source cloud 304, and then migrate the object to the destination cloud 306. During the migration of the object, the object may be marked as "in-transit" by the OMM 302 in the object directory 312. During the migration of the object, the object may exist at the source cloud 304 until completion of the object migration. The serialized object may be loaded at the destination interface 316 executed at the destination cloud 306. The destination interface 316 may be configured to de-serialize the object and persist the de-serialized object 314 at the destination cloud 306. After the de-serialized object has been loaded at the destination cloud 306, the object may be marked as "migrated" in the object directory 312. In one example embodiment, the OMM 302 may select another object to be migrated after successful migration of the object from the source cloud 304 to the destination cloud 306 and repeat the process described above. Once all of the objects of the application have been migrated from the source cloud 304 to the destination cloud 306, the migration may be designated as complete. In some examples, the OMM 302 may manipulate a domain name system name-to-IP mapping such that requests for the application after the completed migration may be directed to the destination cloud 306 for handling.

In a system according to embodiments, as previously described, the OMM 302 may migrate an application one object at a time until the objects are successfully migrated to the destination cloud 306. In another embodiment, the OMM 302 may adjust a number of objects that may be migrated concurrently from the source cloud 304 to the destination cloud 306 according to a predefined migration plan. Alternatively, the OMM 302 may dynamically adjust the number of objects based on predefined factors. For example the OMM 302 may determine that a performance of the application may be improved by migrating a cluster of objects together. The OMM 302 may migrate the cluster of objects together based on an identified interconnection between objects. For example, objects that refer to each other may be determined to be interconnected and may be migrated to the destination cloud 306 concurrently as a cluster of objects. The OMM 302 may also determine that it may be impractical to migrate a cluster of interconnected objects together if it would be overly burdensome or be overly time consuming. In this case, the OMM 302 may separate the objects into smaller clusters or migrate the objects individually.

In some examples, the OMM 302 may determine an order of object migration itself. Alternatively, the OMM 302 may follow an order of object migration selected by an owner of the application. An example strategy for determining an order of object migration may give priority to objects that are busier than other objects. For example, the objects may be prioritized based on a write-access rate associated with each of the objects. In another strategy, the OMM 302 may consult object access statistics to identify periods of high and low activities. The OMM 302 may migrate the objects during an identified period of reduced activity of the application.

In one example embodiment, the OMM 302 may handle incoming requests for access to the application during the migration process employing the shim API 320 at the OMM 302. When a request for an object of the application is received, the OMM 302 may identify a location of the requested object by consulting the object directory 312. If the object has been migrated to the destination cloud 306, the shim API 320 may direct the request to the destination API 324 for handling the request. If the object has not been migrated yet, the shim API 320 may direct the request to the source API 322 for handling the request. If the object has been marked as "in-transit" and the request is a read-only request, then the request may be directed to the source API 322.

If the object has been marked as "in-transit" and the request is a write-access request, then the OMM 302 may perform one or more alternative actions. In one example scenario, the OMM 302 may hold the write-access request for a defined period of time, and may redirect the request to the destination API 324 upon completion of migration of the object to the destination cloud 306. In another example scenario, the OMM 302 may fail the write-access request, and direct the requester to re-request after a period of time. In yet another example scenario, the OMM 302 may abort the migration of the object and may redirect the write-access request to the source API 322. During the migration of the object, the object may still exist at the source cloud 304 until completion of the object migration. The OMM 302 may determine which scenario to select based on predefined settings set by the application owner, a service level agreement of one of the source cloud 304 and the destination cloud 306, and/or object statistics such as a limit on a number of aborts, for example.

Serialization may be implemented using extensible markup language (XML) format or other standardized or proprietary serialization formats. The serialization formats may be human readable (e.g., XML or JSON) or binary such as OGDL, which is aimed at serializing graphs and may be suitable for complex object layouts.

Figure 4:
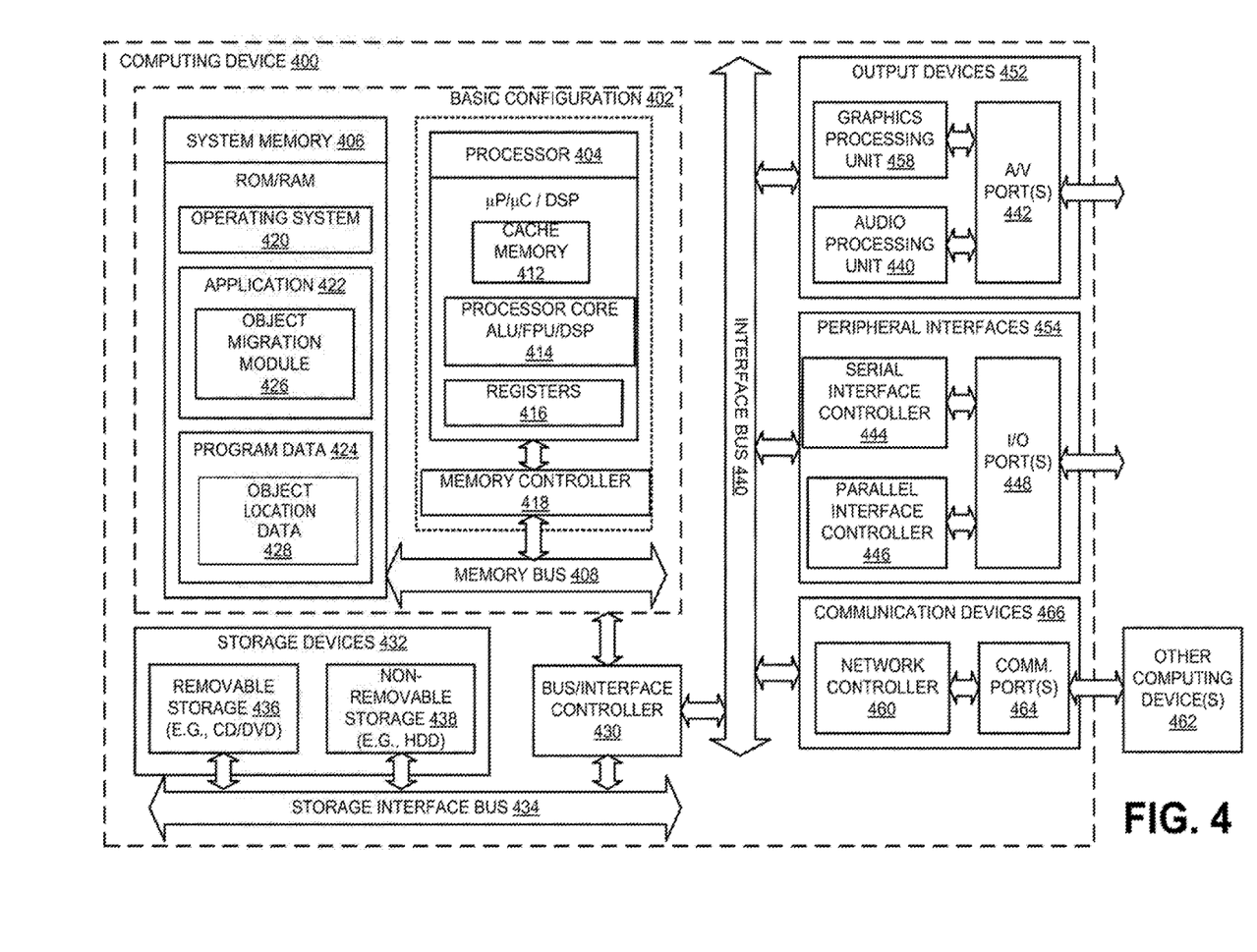
FIG. 4 illustrates a general purpose computing device, which may be used to migrate an application from a source to a destination cloud computing environment.

FIG. 4 illustrates a general purpose computing device, which may be used to migrate an application from a source to a destination cloud computing environment, arranged in accordance with at least some embodiments as described herein. For example, a computing device 400 may be used as servers 104, 114, or 118 of FIG. 1. In an example basic configuration 402, the computing device 400 may include one or more processors 404 and a system memory 406. A memory bus 408 may be used for communicating between the processor 404 and a system memory 406. The basic configuration 402 is illustrated in FIG. 4 by those components within the inner dashed line.

Depending on the desired configuration, the processor 404 may be of any type, including but not limited to a microprocessor (µP), a microcontroller (µC), a digital signal processor (DSP), or any combination thereof. The processor 404 may include one more levels of caching, such as a cache memory 412, a processor core 414, and registers 416. The example processor core 414 may include an arithmetic logic unit (ALU), a floating point unit (FPU), a digital signal processing core (DSP Core), or any combination thereof. An example memory controller 418 may also be used with the processor 404, or in some implementations the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 may include an operating system 420, one or more applications 422, and program data 424. The applications 422 may include a cloud management application, including an object migration module 426, which may facilitate migrating individual objects of an application from a source cloud computing environment to a destination cloud computing environment as described herein. The program data 424 may include, among other data, object location data 428, or the like, as described herein.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (e.g., one or more output devices 452, one or more peripheral interfaces 454, and one or more communication devices 466) to the basic configuration 402 via the bus/interface controller 430. Some of the example output devices 452 include a graphics processing unit 458 and an audio processing unit 440, which may be configured to communicate to various external devices such as a display or speakers via one or more A/V ports 442. One or more example peripheral interfaces 454 may include a serial interface controller 444 or a parallel interface controller 446, which may be configured to communicate with external devices such as input devices (e.g., keyboard, mouse, pen, voice input device, touch input device, etc.) or other peripheral devices (e.g., printer, scanner, etc.) via one or more I/O ports 448. An example communication device 466 includes a network controller 460, which may be arranged to facilitate communications with one or more other computing devices 462 over a network communication link via one or more communication ports 464. The one or more other computing devices 462 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a part of a general purpose or specialized server, mainframe, or similar computer that includes any of the above functions. The computing device 400 may also be implemented as a personal computer including both laptop computer and non-laptop computer configurations.

Example embodiments may also include methods for maintaining application performances upon transfer between cloud servers. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other examples, the human interaction can be automated such as by pre-selected criteria that may be machine automated.

Figure 5:
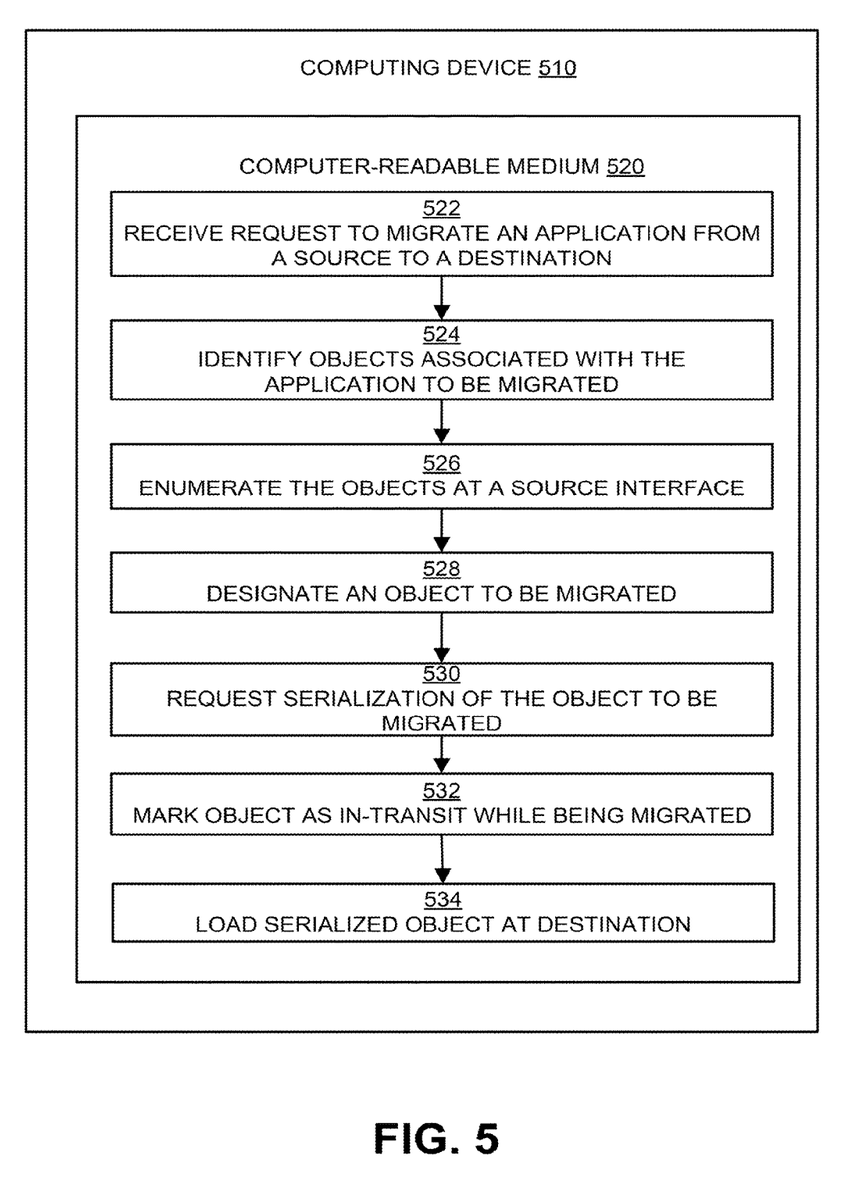
FIG. 5 is a flow diagram illustrating an example method that may be performed by a computing device such as the computing device in FIG. 4.

FIG. 5 is a flow diagram illustrating an example method that may be performed by a computing device such as the device 400 in FIG. 4, arranged in accordance with at least some embodiments described herein. Example methods may include one or more operations, functions or actions as illustrated by one or more of blocks 522, 524, 526, 528, 530, 532 and/or 534. The operations described in the blocks 522 through 534 may also be stored as computer-executable instructions in a computer-readable medium such as a computer-readable medium 520 of a computing device 510.

An example process for migrating an application from a source cloud computing environment to a destination cloud computing environment employing object migration may begin with block 522, "RECEIVE REQUEST TO MIGRATE AN APPLICATION FROM A SOURCE TO A DESTINATION," where an object migration manager (OMM) such as the OMM 302 in FIG. 3 may receive a request to migrate an application from a source cloud computing environment to a destination cloud computing environment.

Block 522 may be followed by block 524, "IDENTIFY OBJECTS ASSOCIATED WITH THE APPLICATION TO BE MIGRATED," where the OMM 302 may identify objects associated with the application to be migrated. The OMM 302 may create an object directory to continuously track a location of the identified objects during the migration process.

Block 524 may be followed by block 526, "ENUMERATE THE OBJECTS AT A SOURCE INTERFACE," where the OMM 302 may implement the source interface 310 at the source cloud 304. The OMM 302 may request the source interface 310 to enumerate the objects associated with the application.

Block 526 may be followed by block 528, "DESIGNATE AN OBJECT TO BE MIGRATED," where the OMM 302 may designate at least one object to be migrated. The OMM 302 may also designate a cluster of objects to be migrated if the OMM identifies interconnected objects.

Block 528 may be followed by block 530, "REQUEST SERIALIZATION OF THE OBJECT TO BE MIGRATED," where the OMM 302 may request the source interface 310 to serialize the objects to be migrated.

Block 530 may be followed by block 532, "MARK OBJECT AS IN-TRANSIT WHILE BEING MIGRATED," where the object to be migrated may be marked as in-transit in the object directory 312 at the OMM 302.

Block 532 may be followed by block 534, "LOAD SERIALIZED OBJECT AT DESTINATION," where the serialized object may be loaded at a destination interface executed at the destination cloud computing environment. The destination interface 316 may de-serialize the object, and may persist the object at the destination cloud 306.

The blocks included in the above described process are for illustration purposes. Migration of an application from a source cloud computing environment to a destination cloud computing environment employing object migration may be implemented by similar processes with fewer or additional blocks. In some examples, the blocks may be performed in a different order. In some other examples, various blocks may be eliminated. In still other examples, various blocks may be divided into additional blocks, or combined together into fewer blocks.

Figure 6:
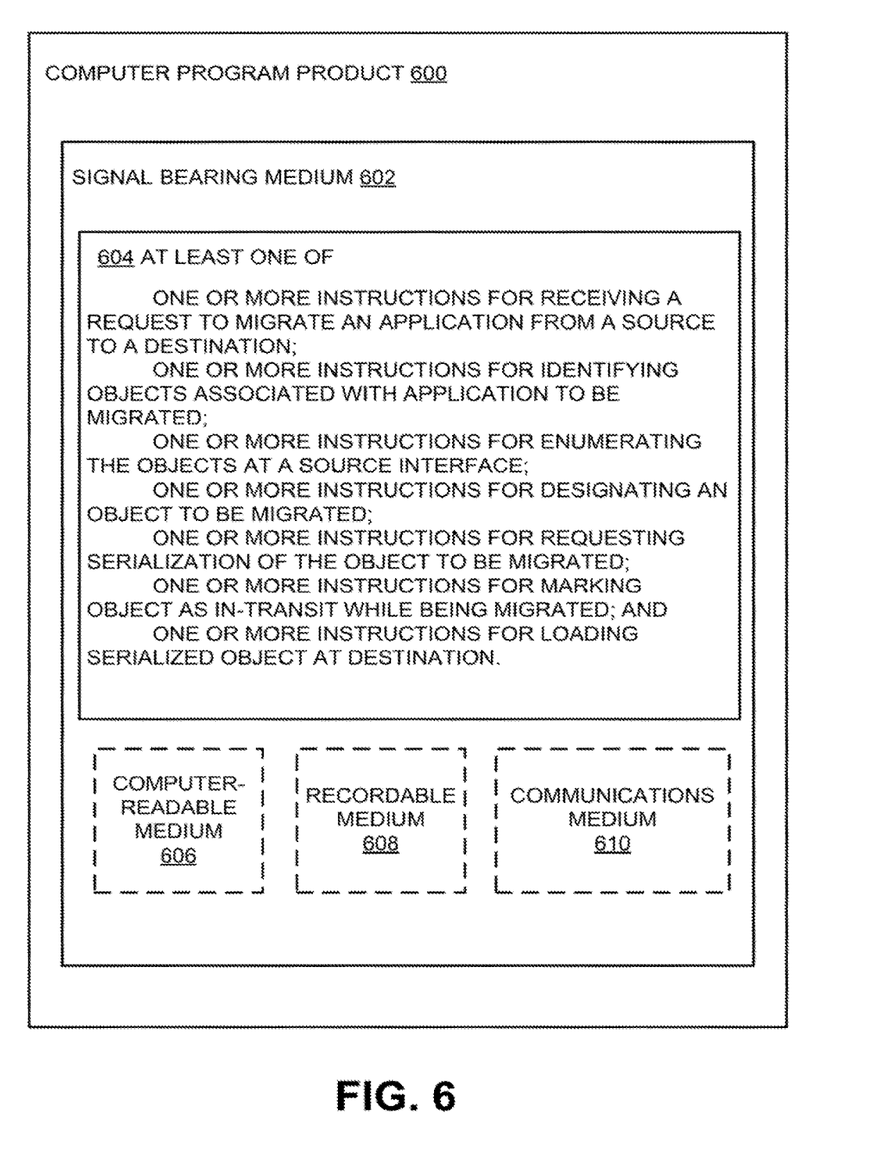
FIG. 6 illustrates a block diagram of an example computer program product, all arranged in accordance with at least some embodiments as described herein.

FIG. 6 illustrates a block diagram of an example computer program product, arranged in accordance with at least some embodiments described herein.

In some examples, as shown in FIG. 6, a computer program product 600 may include a signal bearing medium 602 that may also include one or more machine readable instructions 604 that, when executed by, for example, a processor, may provide the functionality described herein. Thus, for example, referring to the processor 404 in FIG. 4, the object migration module 426 may undertake one or more of the tasks shown in FIG. 6 in response to the instructions 604 conveyed to the processor 404 by the signal bearing medium 602 to perform actions associated with maintaining application performances upon transfer between cloud servers as described herein. Some of those instructions may include, for example, instructions for receiving a request to migrate an application from a source to a destination, identifying objects associated with the application to be migrated, enumerating the objects at a source interface, designating an object to be migrated, requesting serialization of the object to be migrated, marking the objects as in-transit while being migrated, and loading the serialized objects at destination, according to some embodiments described herein.

In some implementations, the signal bearing medium 602 depicted in FIG. 6 may encompass a computer-readable medium 606, such as, but not limited to, a hard disk drive (HDD), a solid state drive, a Compact Disc (CD), a Digital Versatile Disk (DVD), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the computer program product 600 may be conveyed to one or more modules of the processor 404 by an RF signal bearing medium, where the signal bearing medium 602 is conveyed by the wireless communications medium 610 (e.g., a wireless communications medium conforming with the IEEE 802.11 standard).

According to some examples, the present disclosure describes a method for migrating an application between cloud computing environments. The method may include receiving a request to migrate an application from a source cloud to a destination cloud, identifying one or more objects associated with the application to be migrated, enumerating the one or more objects employing a source interface executed at the source cloud, designating at least one object to be migrated to the destination cloud, requesting a serialization of the object to be migrated from the source interface, marking the serialized object as in-transit while the serialized object may be in process of being migrated from the source cloud to the destination cloud, and loading the serialized object at the destination cloud.

According to some examples, the method may also include migrating one object at a time until objects associated with the application may be migrated from the source cloud to the destination cloud. The method may include migrating two or more interconnected objects at a time until objects associated with the application may be migrated from the source cloud to the destination cloud, where the two or more objects may be interconnected if at least one of the objects refers to at least one other object.

According to some examples, the method may also include migrating the one or more objects associated with the application according to a prioritized order of the objects, wherein the objects may be prioritized based on a write-access rate associated with each of the objects. The method may include migrating the one or more objects during an identified period of reduced activity of the application. Identifying the one or more objects associated with the application may include loading an access pattern map associated with the application identifying the one or more objects of the application and one of an access method interface or an access call for each of the one or more objects.

According to some examples, the method may also include maintaining a directory of where the objects associated with the application reside during the migration, wherein each object resides at one of: the source cloud, the destination cloud, or in-transit between the source cloud and the destination cloud. The object may be serialized employing an extensible markup language (XML) serialization schema, a Java Script Object Notation (JSON) schema, or an ordered graph data language (OGDL) schema.

According to other examples, the method may also include while the migration is in progress, intercepting a request for access to an object at an application programming interface (API) published by an object migration manager, and redirecting the intercepted request from the object migration manager API to one of: the source cloud and/or the destination cloud.

According to other examples, the method may also include redirecting another request based on a current location of the object. The method may include submitting a call to a destination interface at the destination cloud to hand over a migrating object. The method may include marking the object as migrated when the object may be loaded at the destination cloud, and deleting the migrated object from the source cloud.

According to other examples, the method may also include marking the migration of the application as complete when all objects associated with the application have been successfully migrated to the destination cloud. The method may include after migration of the application may be complete, redirecting a request directed to the application to the destination cloud by updating a domain name system to point to the destination cloud. In response to detecting a collision between a request leading to a modification of an existing object and the existing object's migration at the same time, one of the following actions may be performed: backing off the migration, allowing the request to proceed, and resuming the migration; holding the request for a predefined period until the migration of the existing object completes; or declining the request According to other examples, the present disclosure also describes computing device operable to migrate an application between cloud computing environments. The computing device may include a memory configured to store instructions, and a processing unit configured to execute an object migration module in conjunction with the instructions. The object migration module may be configured to receive a request to migrate an application from a source cloud to a destination cloud, identify one or more objects associated with the application to be migrated, enumerate the one or more objects employing a source interface executed at the source cloud, designate at least one object to be migrated to the destination cloud, request a serialization of the object to be migrated from the source interface, mark the object as in-transit while the object may be in process of being migrated from the source cloud to the destination cloud, and load the serialized object at the destination cloud.

According to other examples, the object migration module may be further configured to migrate one object at a time until objects associated with the application may be migrated from the source cloud to the destination cloud. The object migration module may be further configured to migrate two or more interconnected objects at a time until objects associated with the application may be migrated from the source cloud to the destination cloud, where the two or more objects may be interconnected if the objects refer to each other. The object migration module may be further configured to migrate the one or more objects associated with the application according to a prioritized order of the objects, where the objects may be prioritized based on a write-access rate associated with each of the objects.

According to other examples, the object migration module may be further configured to migrate the one or more objects during an identified period of reduced activity of the application. The object migration module may be further configured to load an access pattern map associated with the application, where the access pattern map identifies the one or more objects of the application and one of an access method interface or an access call for each of the one or more objects.

According to further examples, the object migration module may be further configured to maintain a directory of where the objects associated with the application reside during the migration, wherein each object resides at one of: the source cloud, the destination cloud, or in-transit between the source cloud and the destination cloud. The object may be serialized employing an extensible markup language (XML) serialization schema, a Java Script Object Notation (JSON) schema, or an ordered graph data language (OGDL) schema.

According to further examples, the object migration module may be further configured to while the migration is in progress, intercept a request for access to an object directed to the application at an application programming interface (API) published by the object migration module, and redirect the intercepted request from the object migration manager API to one of the source cloud and/or the destination cloud.

According to further examples, the object migration module may be further configured to redirect another request directed to the application to the source cloud and/or the destination cloud-based on a current location of the object associated with the other request. The object manager module may also be configured to submit a call to a destination interface at the destination cloud to hand over a migrating object. The object migration module may be further configured to mark the object as migrated when the object may be loaded at the destination cloud, and delete the migrated object from the source cloud.

According to further examples, the object migration module may be further configured to mark the migration of the application as complete when all objects associated with the application have been successfully migrated to the destination cloud. The object migration module may be further configured to after migration of the application may be complete, redirect a request directed to the application to the destination cloud by updating a domain name system to point to the destination cloud. In response to detecting a collision between a request leading to a modification of an existing object and the existing object's migration at the same time, one of the following actions may be performed: backing off the migration, allowing the request to proceed, and resuming the migration; holding the request for a predefined period until the migration of the existing object completes; or declining the request. The object migration module may be hosted at the source cloud. The object migration module may be hosted at the destination cloud. The object migration module may be hosted at a third party migration entity.

According to further examples, the present disclosure describes a computer readable medium with instructions stored thereon, which when executed on one or more computing devices executes a method for migrating an application between cloud computing environments. The method may include receiving a request to migrate an application from a source cloud to a destination cloud, identifying one or more objects associated with the application to be migrated, enumerating the one or more objects employing a source interface executed at the source cloud, designating at least one object to be migrated to the destination cloud, requesting a serialization of the object to be migrated from the source interface, marking the serialized object as in-transit while the serialized object may be in process of being migrated from the source cloud to the destination cloud, and loading an access pattern map associated with the application identifying the one or more objects of the application and one of an access method interface or an access call for each of the one or more objects.

According to some examples, the method may also include migrating one object at a time until objects associated with the application may be migrated from the source cloud to the destination cloud. The method may include migrating two or more interconnected objects at a time until objects associated with the application may be migrated from the source cloud to the destination cloud, wherein the two or more objects may be interconnected if the objects refer to each other.

According to some examples, the method may also include migrating the one or more objects associated with the application according to a prioritized order of the objects, wherein the objects may be prioritized based on a write-access rate associated with each of the objects. The method may include migrating the one or more objects during an identified period of reduced activity of the application. Identifying the one or more objects associated with the application may include loading an access pattern map associated with the application identifying the one or more objects of the application and an access technique for each of the one or more objects.

According to some examples, the method may also include maintaining a directory of where the objects associated with the application reside during the migration, wherein each object resides at one of: the source cloud, the destination cloud, or in-transit between the source cloud and the destination cloud. The object may be serialized employing an extensible markup language (XML) serialization schema, a Java Script Object Notation (JSON) schema, or an ordered graph data language (OGDL) schema.

According to other examples, the method may also include while the migration is in progress, intercepting a request for access to an object at an application programming interface (API) published by an object migration manager, and redirecting the intercepted request from the object migration manager API to one of: the source cloud and/or the destination cloud.

According to other examples, the method may also include redirecting another request based on a current location of the object. The method may include submitting a call to a destination interface at the destination cloud to hand over a migrating object. The method may include marking the object as migrated when the object may be loaded at the destination cloud, and deleting the migrated object from the source cloud.

According to other examples, the method may also include marking the migration of the application as complete when all objects associated with the application have been successfully migrated to the destination cloud. The method may include after migration of the application may be complete, redirecting a request directed to the application to the destination cloud by updating a domain name system to point to the destination cloud. In response to detecting a collision between a request leading to a modification of an existing object and the existing object's migration at the same time, one of the following actions may be performed: backing off the migration, allowing the request to proceed, and resuming the migration; holding the request for a predefined period until the migration of the existing object completes; or declining the request.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to migrate an application between cloud computing environments, the method comprising:
receiving a request to migrate an application from a source cloud to a destination cloud;
identifying one or more objects associated with the application to be migrated;
enumerating the one or more objects by employing a source interlace executed at the source cloud;
designating at least one object to be migrated to the destination cloud, based on a prioritized order of the at least one object among the one or more objects associated with the application to be migrated, wherein the prioritized order is based on a write-access rate associated with the at least one object;

requesting, from the source interface executed at the source cloud, a serialization of the at least one object to be migrated;

marking the serialized at least one object as in-transit while the serialized at least one object is in process of being migrated from the source cloud to the destination cloud;

storing in-transit location information of the serialized at least one object in a directory to track where the one or more objects associated with the application reside during the migration of the at least one object;

intercepting a request for access to the serialized at least one object at an application program interface (API) published by an object migration manager while the serialized at least one object is in the process of being migrated from the source cloud to the destination cloud;

redirecting the request to a particular location based on the in-transit location information of the serialized at least one object retrieved from the directory;

in response to a determination that the serialized at least one object is in-transit and the request is a read-only request, redirecting the read-only request to a source API of the source cloud;

in response to a determination that the serialized at least one object is in-transit and the request is a write-access request, selecting to one of:
  hold the write-access request, and redirect the write-access request to a destination API of the destination cloud after completion of the migration of the serialized at least one object to the destination cloud;
  fail the write-access request, and direct a requester to re-request after a period of time; or
  abort the migration of the serialized at least one object, redirect the write-access request to the source API, and resume the migration of the at least one object following completion of the write-access request; and loading the serialized at least one object at the destination cloud.

2. The method according to claim 1, wherein identifying the one or more objects associated with the application comprises:
  loading an access pattern map associated with the application, wherein the access pattern map identifies the one or more objects of the application and one of an access method interface or an access call for each of the one or more objects.

3. The method according to claim 1, further comprising:
  maintaining the directory that tracks where the one or more objects associated with the application reside during the migration, wherein each object resides at one of: the source cloud, the destination cloud, or in-transit between the source cloud and the destination cloud.

4. The method according to claim 1, further comprising:
  redirecting another request based on a current location of the serialized at least one object.

5. The method according to claim 1, further comprising:
  submitting a call to a destination interface at the destination cloud to hand over a migrating object.

6. The method according to claim 1, further comprising:
  marking the serialized at least one object as migrated after the serialized at least one object is loaded at the destination cloud; and
  deleting the migrated at least one object from the source cloud.

7. The method according to claim 6, further comprising:
  marking the migration of the application as complete after all objects associated with the application have been successfully migrated to the destination cloud.

8. The method according to claim 7, further comprising:
  after the migration of the application is complete, redirecting a request directed to the application to the destination cloud by updating a domain name system to point to the destination cloud.

9. A computing device operable to migrate an application between cloud computing environments, the computing device comprising:
  a memory configured to store instructions; and
  a processor configured to execute an object migration module in conjunction with the instructions, wherein the object migration module is configured to:
    receive a request to migrate the application from a source cloud to a destination cloud;
    identify one or more objects associated with the application to be migrated;
    enumerate the one or more objects by employment of a source interface executed at the source cloud;
    dynamically adjust a number of the one or more objects to be migrated concurrently to the destination cloud based on identified interconnections between the one or more objects, wherein the one or more objects are migrated to the destination cloud according to a prioritized order based on a write-access rate associated with each of the one or more objects, and wherein at least one object is designated to be migrated to the destination cloud;
    request, from the source interface executed at the source cloud, a serialization of the at least one object to be migrated;
    mark the serialized at least one object as in-transit while the serialized at least one object is in process of being migrated from the source cloud to the destination cloud;
    store in-transit location information of the serialized at least one object in a directory to track where the one or more objects associated with the application reside during the migration of the at least one object;
    intercept a request for access to the serialized at least one object directed to the application at an application program interface (API) published by the object migration module while the serialized at least one object is in the process of being migrated from the source cloud to the destination cloud;
    redirect the request to a particular location based on the in-transit location information of the serialized at least one object retrieved from the directory;
    in response to a determination that the serialized at least one object is in-transit and the request is a read-only request, redirect the read-only request to a source API of the source cloud;
    in response to a determination that the serialized at least one object is in-transit and the request is a write-access request, select to one of:
      hold the write-access request and redirect the write-access request to a destination API of the destination cloud after completion of migration of the serialized at least one object to the destination cloud;
      fail the write-access request and instruct a requester to re-request after a period of time; or
      abort the migration of the serialized at least one object, redirect the write-access request to the source API of the source cloud, and resume the migration of the at least one object following completion of the write-access request, wherein the selection is based on predefined settings set by an owner of the application, a service level agreement (SLA) of one of the source cloud and the destination cloud, and object statistics; and load the serialized at least one object at the destination cloud.

10. The computing device according to claim 9, wherein the object migration module is configured to:
migrate one object at a time until the one or more objects associated with the application are migrated from the source cloud to the destination cloud.

11. The computing device according to claim 9, wherein the object migration module is configured to;
migrate two or more interconnected objects at a time until the one or more objects associated with the application are migrated from the source cloud to the destination cloud, wherein the two or more objects are interconnected if the two or more objects refer to each other.

12. The computing device according to claim 9, wherein the object migration module is configured to:
migrate the one or more objects during an identified period of reduced activity of the application.

13. The computing device according to claim 9, wherein the object migration module is hosted at the source cloud.

14. The computing device according to claim 9, wherein the object migration module is hosted at the destination cloud.

15. The computing device according to claim 9, wherein the object migration module is hosted at a third party migration entity.

16. A non-transitory computer readable medium with instructions stored thereon that, in response to execution on one or more computing devices, execute a method to migrate an application between cloud computing environments, wherein the method includes:
receiving a request to migrate the application from a source cloud to a destination cloud;
identifying one or more objects associated with the application to be migrated;
enumerating the one or more objects by employing a source interface executed at the source cloud;
dynamically adjusting a number of the one or more objects to be migrated concurrently to the destination cloud based on identified interconnections between the one or more objects, wherein the one or more objects are migrated to the destination cloud according to a prioritized order based on a write-access rate associated with each of the one or more objects, and wherein at least one object is designated to be migrated to the destination cloud;
requesting, from the source interface executed at the source cloud, a serialization of the at least one object to be migrated;
marking the serialized at least one object as in-transit while the serialized at least one object is in process of being migrated from the source cloud to the destination cloud;
storing in-transit location information of the serialized at least one object in a directory to track where each object associated with the application resides during the migration of the at least one object;
intercepting a request for access to the serialized at least one object at an application program interface (API) published by an object migration manager while the serialized at least one object is in the process of being migrated from the source cloud to the destination cloud;
redirecting the request to a particular location based on the in-transit location information of the serialized at least one object retrieved from the directory;
in response to a determination that the serialized at least one object is in-transit and the request is a read-only request, redirecting the read-only request to a source API of the source cloud;
in response to a determination that the serialized at least one object is in-transit and the request is a write-access request, selecting to one of:
hold the write-access request and redirect the write-access request to a destination API after completion of the migration of the serialized at least one object to the destination cloud;
fail the write-access request and instruct a requester to re-request after a period of time; or
abort the migration of the serialized at least one object, redirect the write-access request to the source API, and resume the migration of the at least one object following completion of the write-access request, wherein the selection is based on predefined settings set by an owner of the application, a service level agreement (SLA) of one of the source cloud and the destination cloud, and object statistics; and
loading the serialized at least one object at the destination cloud.

17. The non-transitory computer readable medium according to claim 16, wherein the at least one object is serialized by employing one of an extensible markup language (XML) serialization schema, a Java Script Object Notation (JSON) schema, or an ordered graph data language (OGDL) schema.

18. The non-transitory computer readable medium according to claim 16, wherein the method further comprises:
redirecting another request based on a current location of the serialized at least one object.

19. The non-transitory computer readable medium according to claim 16, wherein the method further comprises:
submitting a call to a destination interface at the destination cloud to hand over a migrating object.

20. The non-transitory computer readable medium according to claim 16, wherein the method further comprises:
marking the at least one object as migrated after the serialized at least one object is loaded at the destination cloud; and
deleting the migrated at least one object from the source cloud.

* * * * *

UNITED STATES PATENT AND TRADEMARK OFFICE
CERTIFICATE OF CORRECTION

| | | |
|---|---|---|
| PATENT NO. | : 9,648,134 B2 | Page 1 of 1 |
| APPLICATION NO. | : 14/003770 | |
| DATED | : May 9, 2017 | |
| INVENTOR(S) | : Frank | |

It is certified that error appears in the above-identified patent and that said Letters Patent is hereby corrected as shown below:

In Column 18, Line 61, in Claim 1, delete "interlace" and insert -- interface --, therefor.

In Column 18, Line 63, in Claim 1, delete "cloud," and insert -- cloud --, therefor.

In Column 21, Line 17, in Claim 11, delete "to;" and insert -- to: --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*